L. LEWKOWICZ.
VEHICLE.
APPLICATION FILED JAN. 14, 1913.
1,256,239.
Patented Feb. 12, 1918.
3 SHEETS—SHEET 1.
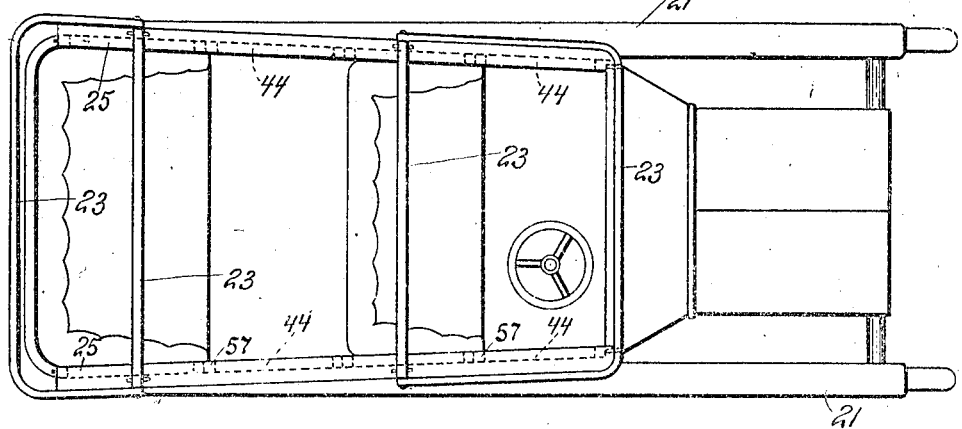
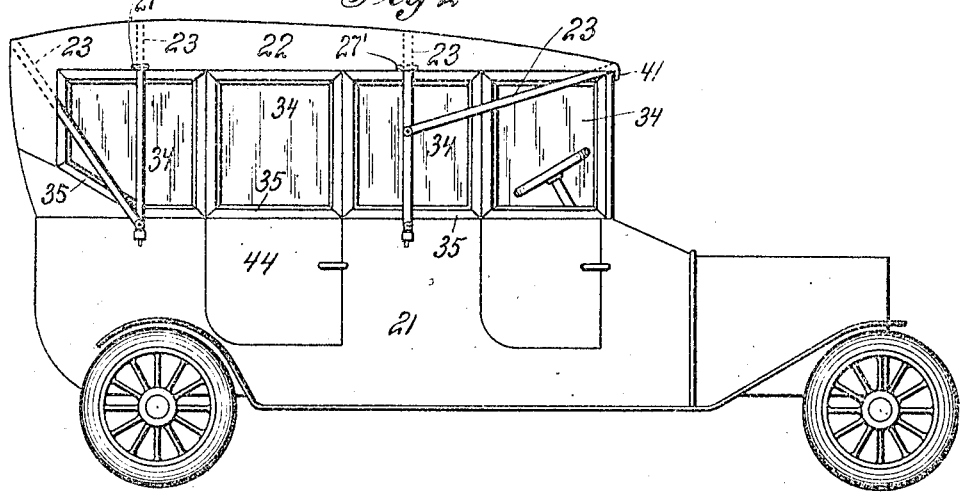
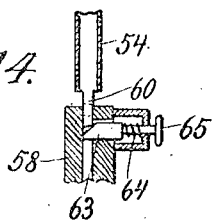
WITNESSES:
INVENTOR
BY
ATTORNEY L. LEWKOWICZ.
VEHICLE.
APPLICATION FILED JAN. 14, 1913.
1,256,239.
Patented Feb. 12, 1918.
3 SHEETS—SHEET 2.
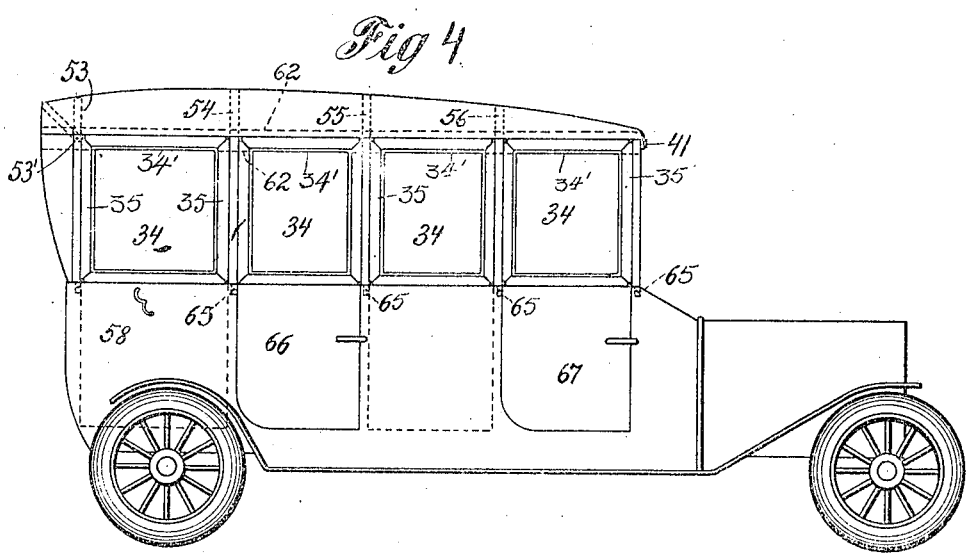
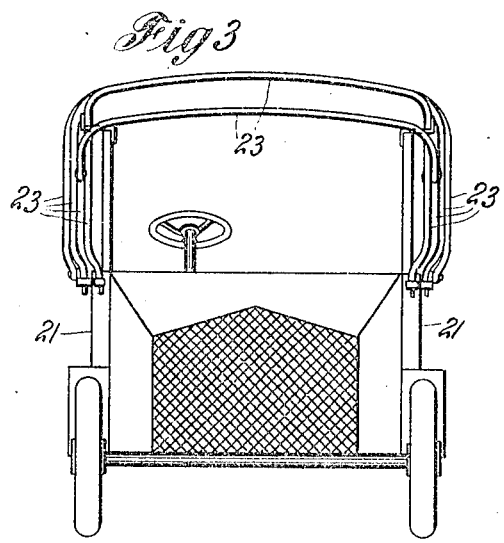
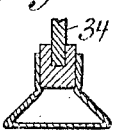

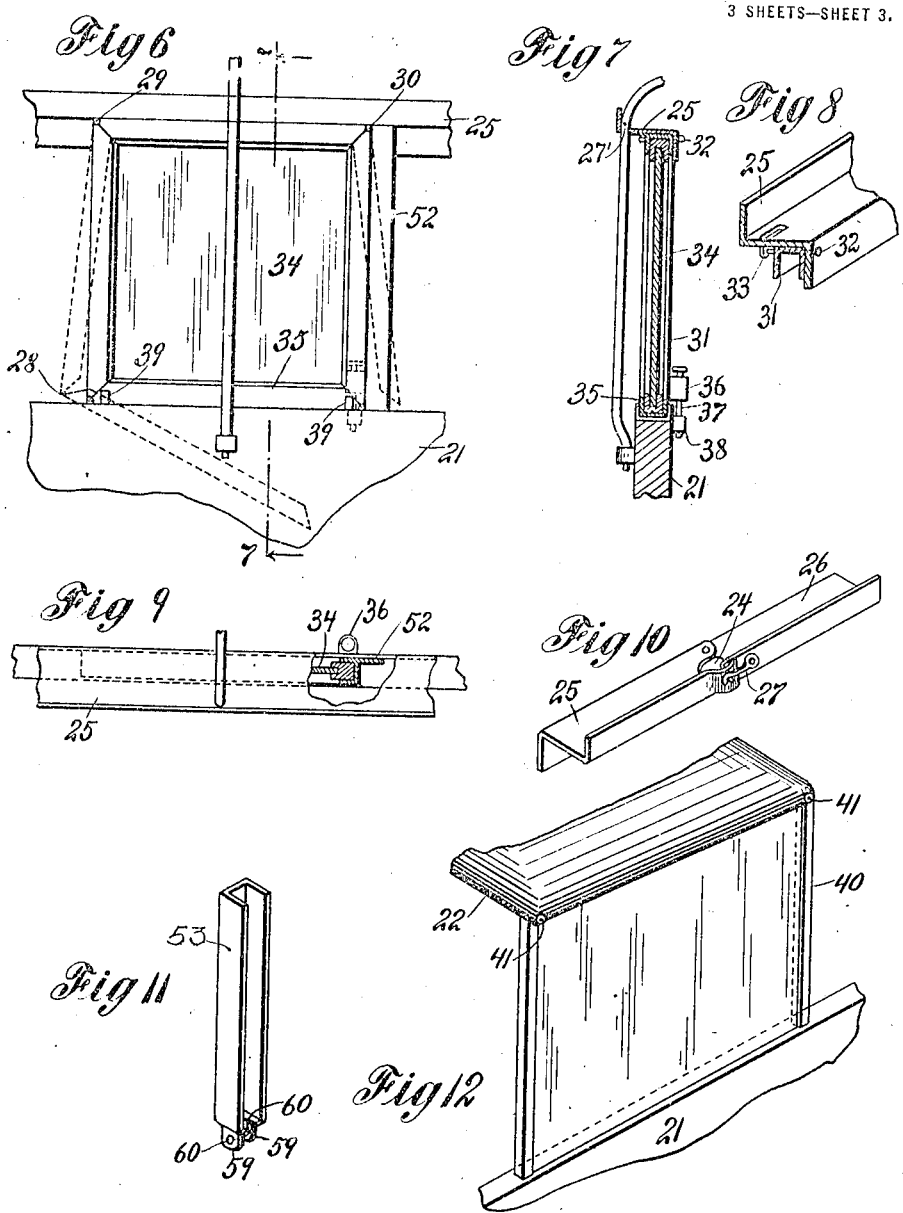

UNITED STATES PATENT OFFICE.

LADIS LEWKOWICZ, OF NEW YORK, N. Y., ASSIGNOR TO CONVERTIBLE AUTOMOBILE BODY CORPORATION, OF NEW YORK, N. Y., A CORPORATION OF NEW YORK.

VEHICLE.

1,256,239.  Specification of Letters Patent.  Patented Feb. 12, 1918.

Application filed January 14, 1913. Serial No. 741,935.

*To all whom it may concern:*

Be it known that I, LADIS LEWKOWICZ, a citizen of the United States, residing at the borough of Manhattan, in the county of New York and State of New York, have invented certain new and useful Improvements in Vehicles, of which the following is a specification, reference being had therein to the accompanying drawing.

My invention relates to improvements in vehicles and more particularly has reference to means in combination with a vehicle whereby the same may be inclosed or opened up as desired.

In the accompanying drawings I have illustrated my invention in its application to an automobile, in one instance showing the arrangement as a permanent structure and in a modified form illustrating the application of my invention for inclosing the open or touring car type of machine.

In the said drawings in Figure 1 I have illustrated in plan view a touring car with part of the hood removed, and Fig. 2 is a side elevation of the same illustrating one application of my invention. Fig. 3 is a front elevation of the car shown in Figs. 1 and 2. Fig. 4 is a side elevation of a modified form of car showing the same inclosed. Fig. 5 is an enlarged cross section partly broken away illustrating one of the window casings or guides with part of the window frame in position. Fig. 6 is an enlarged elevation partly broken away illustrating the position of part of the window casing and showing the same partly opened out in dotted outline. Fig. 7 is a cross section on the line 7—7 of Fig. 6. Fig 8 is a perspective view partly broken away illustrating part of the frame or casing beneath the hood of the machine to which the window casing is preferably secured. Fig. 9 is a plan view partly broken away illustrating said framework and part of the window casing in position, together with other details. Fig. 10 is a perspective view illustrating two adjoining and interlocking sections of the framework beneath the edge of the hood. Fig. 11 is an enlarged perspective view of part of one form of window casing more particularly as adapted for use in the modification shown in Fig. 4. Fig. 12 is a perspective view partly broken away illustrating the method of securing the top of the wind shield and front of the hood, and Fig. 13 is an enlarged cross section illustrating one of the catch mechanisms adapted for interlocking the top of said wind shield and the front edge of said hood, and Fig. 14 is an enlarged cross section with parts broken away illustrating the method of securing the lower end of the hood supports such as shown in Fig. 11 to the body portion of the vehicle shown in Fig. 4.

Referring now more particularly to Figs. 1 to 3 inclusive, 21 is the body of the vehicle upon which the usual form of hood 22 is secured by the usual U-shaped hood brackets or supports 23. By reference more particularly to Fig. 2 is will be observed that the hood 22 of the usual form of touring car is opened out in position. While in this condition the upper framework or Z-bar shown to better advantage in Fig. 10 is secured parallel and within the lower sides of said hood. That is to say, the uprights or U-shaped hood supports 23 are engaged within openings such as 24 between adjacent sections such as 25—26 of said Z-shaped frame and the same is inclosed around said supports or brackets and may be secured in said position by any suitable means such as the hook 27 and by suitable additional means such as the bolt 27'. From this it will be seen that the upper or main attachable framework may be quickly placed in position or removed and folded up out of the way. The window casings are shown to better advantage in Figs. 6 to 11 inclusive, excepting Fig. 10. In each of said figures it will be observed that there is an outer rectangular framework formed of channel irons mortised at their ends to form a rectangular U-channel receptacle for the window frame 34'. The adjoining ends of these channels it will be observed are hinged as shown to better advantage at 28 to 30 inclusive, the hinges 29 and 30 being mounted within or upon the upper Z-shaped framework 25 as shown to better advantage in Fig. 8 where it will be observed that the window casing 31 is provided with a pivot or pin bearing such as 32 which may project through one side of the Z-bar and which may be hung from the other side of the Z-bar by a suitable ear or flange such as 33 punched out of the same. From this it will be seen that the window casings may if desirable be readily separated from the Z-frame at the top of the machine and can be folded in convenient position for storing. In assembling the window frames, etc., for inclosing the machine, they are put together substantially as shown in dotted outline in Fig. 6 and the windows 34 already mounted within their respective frames 35, are slipped within the rectangular window casings such as 31, and these window casings are then inclosed around the window frame and rest upon the upper edge of the body portion of the vehicle where they may be additionally secured as follows:

Referring now more particularly to Fig. 7 it will be observed that upon the side of the window casing 31 may be provided a suitable bearing or cleat such as 36 provided with a shot-bolt such as 37 adapted to engage a suitable lug or socket such as 38 secured to the body portion 21 of the vehicle. By this means the window casings may be securely and readily fastened in position at will. In addition to the aforesaid means of securing the window casings, cleats or U-shaped brackets such as 39 may be provided upon the upper edge of the body of the vehicle.

Referring now more particularly to Figs. 12 and 13, 22 indicates the hood or top of the machine and 21 the body portion upon which is provided the usual wind shield such as 40. 41 indicates spring engaging buttons for attaching the hood or top of the machine to the top of said wind shield. In Fig. 13 it will be observed that the top of the wind shield is provided with openings such as 42 through which the tapered entering portion 43 of the spring engaging device normally projects so that as the top or hood 22 is pressed down over the top of the wind shield 40, the tapered engaging end 43 slides within the opening 42 thereby securely engaging and locking the combination in position.

Referring now to Fig. 9 one side of the window casing instead of being formed of the usual channel or U-shaped iron may be provided with an extra flange such as 52 on the side adjacent to the door of the vehicle so that the flange 52 thereof serves as a jamb or bumper to stop the closing of the door, and to provide means to exclude the elements.

Referring now more particularly to the form of vehicle shown in Fig. 4, in this structure the form of brackets or supports for the hood illustrated in Figs. 1 to 3 inclusive, it will be observed, are eliminated and the hood is supported by the U-shaped supports 53 to 56 inclusive, the support 53 having a section pivoted at 53' as shown. The opposite sides fore and aft of these standards or supports are provided with channels into which the window frames 57 are adapted to slide, and the body portion 58 of the vehicle is provided with a hollow cavity or recess into which the window may be dropped, this structure being well known in general appearance as generally adapted for railway cars. The ends of the window guides or hood supports are preferably provided with rounded entering portions such as shown to better advantage in Fig. 11 indicated by the reference character 59 and are provided with suitable holes such as 60 in alinement through which a suitable pin or bolt may be passed, also passing through the side of the body of the vehicle as indicated at 65 in Fig. 4. 62 indicates a strip of rubber, felt, composition or other suitable and preferably resilient means or a combination thereof adapted to be engaged by one side of the top of each window when the window is up in position thus serving to exclude any drafts of air, and the said strip of material is preferably secured upon the insides of the uprights which serve for the window casings.

A preferred method for securing the hood supports is illustrated to advantage in Fig. 14. In said figure the body portion of the vehicle is indicated by the reference character 58 and the upright or hood support of Fig. 4 by the reference character 54. The rounded entering portion 60 it will be observed passes through the top of the body portion and presents the hole 60 in alinement with the shot-bolt 63, normally projected by the spring 64 so that when the upright is placed in position it is securely held therein by said bolt and may be conveniently and readily withdrawn therefrom by the finger piece 65.

When removing the top of the vehicle shown in Fig. 4 to convert the same into an open touring car, the windows are first dropped down into the body casing in the usual well known manner after which the front of the top of the hood is disconnected from the wind shield by withdrawing the shot-bolts 43. The bolts or pins 63 are then withdrawn from the uprights such as 53 to 56 inclusive and the same are readily removed so that the same may be slipped back successively and secured in any convenient poistion at the back of the machine together with the cover thereof, the same as in the usual folding of vehicle covers.

With reference to the doors such as 66 and 67, the window frames of these doors do not engage channels formed in the uprights such as 54—55 and 56—57 otherwise it would not be possible for the occupants of the vehicle to pass in and out of the same without removing the top. Accordingly several modifications hereinafter referred to are shown illustrating the construction of the doors and ends therefor.

Of course it will be understood that various modifications may be made without departing from the spirit of the invention as set forth in the claim.

I claim:

A convertible vehicle comprising a body portion and a collapsible hood portion adapted to form a complete closure for the same, rigid inverted U-shaped supports for said hood adapted to rigidly interlock within said body portion at their bases, a wind shield at the front of said vehicle, and means in combination with the top of said wind shield and the front of said hood whereby the same are interlocked when brought together forming an air tight union, and channels in the sides of said supports within which windows may slide, and recesses within said body portion adapted to receive said windows, said windows having collapsible interlocking frames.

In testimony whereof I hereunto affix my signature in the presence of two witnesses.

LADIS LEWKOWICZ.

Witnesses:
LOUISE ENDERLE,
THOMAS A. HILL.